Patented Oct. 27, 1925.

1,558,642

UNITED STATES PATENT OFFICE.

CURTIS A. SIPE, OF YORK, PENNSYLVANIA.

SHAVING SOAP.

No Drawing.  Application filed September 28, 1923.  Serial No. 665,466.

*To all whom it may concern:*

Be it known that I, CURTIS A. SIPE, a citizen of the United States, residing at York, State of Pennsylvania, have invented new and useful Improvements in Shaving Soaps, of which the following is a specification.

The present invention relates to a shaving cream and the process of making same, and the object of the invention is to produce a shaving cream, which will readily soften the beard, and will be free from injurious effects upon the skin, so that there will be no disagreeable after-effects, such as itching, burning or smarting.

The materials used in the preparation of this shaving cream are: boric acid, lye, fat, including cocoanut oil preferably, acetanilid and hydrogen peroxid. A suitable scenting agent also, such as rose water or the like, can be used, although this latter can be omitted if desired.

The following example is given, but it is to be understood that the portions can be varied considerably. 144 ounces of water are first heated to boiling, and 10 ounces of boric acid are added. The mixture is stirred until the boric acid has dissolved, and the liquid is then allowed to cool. 36 ounces of lye are then added, this being caustic soda or caustic potash or a mixture of the two. What is ordinarily known on the market as "Banner-lye" can be used, although other forms of this material can be employed. This consists essentially of caustic soda (somewhat impure). 192 ounces of soap makers fat are then added, together with 16 ounces of cocoanut oil, preferably, although other oils can be used if desired. The mixture is heated and agitated until saponification has been effected, producing a substantially neutral liquid soft soap of a more or less creamy consistency. Then a small quantity of acetanilid and of hydrogen peroxid are added, and in practice I find that 10 grains of acetanilid, and 15 grains of hydrogen peroxid are satisfactory quantities although these quantities are given solely for the purposes of illustration and can be increased or decreased as desired within reasonable limits. To the above mixture, there is then added 16 ounces of boric acid dissolved in 2 quarts of hot water. Rose water or other scenting agent is then added if desired and the mixture is beaten to a soft creamy paste-like material, and is then ready to be put up into tubes, for sale.

I claim:

1. A shaving soap comprising the reaction products of lye, fat, boric acid, together with much smaller quantities of acetanilid and hydrogen peroxid.

2. A shaving soap in the form of a cream-like mass, containing the reaction products of caustic alkali, fats and boric acid in such proportions as to form a substantially neutral soap, with a sufficient amount of water to form a cream-like consistency and much smaller amounts of acetanilid and hydrogen peroxid.

In testimony whereof I affix my signature.

CURTIS A. SIPE.